United States Patent [19]

Pershan

[11] Patent Number: 5,260,986
[45] Date of Patent: Nov. 9, 1993

[54] GROUP NOTIFICATION SERVICE AND SYSTEM

[75] Inventor: Barry Pershan, Olney

[73] Assignee: Bell Atlantic Network Services, Inc., Arlington, Va.

[21] Appl. No.: 689,433

[22] Filed: Apr. 23, 1991

[51] Int. Cl.$^5$ .................. H04M 11/00; H04M 3/38; H04M 3/50
[52] U.S. Cl. ........................... 379/57; 379/67; 379/88; 379/89
[58] Field of Search .............. 379/58, 57, 67, 88, 379/89, 91, 144; 340/825.5, 825.51

[56] References Cited

U.S. PATENT DOCUMENTS

| | | |
|---|---|---|
| 3,761,632 | 9/1973 | Colman . |
| 4,371,751 | 2/1983 | Hilligoss, Jr. . |
| 4,371,752 | 2/1983 | Matthews et al. . |
| 4,446,336 | 5/1984 | Bethel et al. . |
| 4,581,486 | 4/1986 | Matthews et al. . |
| 4,602,129 | 7/1986 | Mathews et al. ............... 379/88 |
| 4,625,081 | 11/1986 | Lotito et al. . |
| 4,761,807 | 8/1988 | Matthews et al. . |
| 4,833,701 | 5/1989 | Comroe et al. ............... 455/33.2 |
| 4,860,341 | 8/1989 | D'Avello et al. ............... 379/91 |
| 4,899,358 | 2/1990 | Blakley ........................... 379/88 |
| 4,926,460 | 5/1990 | Gutman et al. ............... 379/57 |
| 4,961,216 | 10/1990 | Baehr et al. ................... 379/67 |
| 4,965,821 | 10/1990 | Bishop et al. ................. 379/60 |
| 5,058,151 | 10/1991 | Tanaka et al. ................. 379/67 X |

OTHER PUBLICATIONS

Community Alert Network Publication entitled "A Teams Concept –Timely Meregency Alerting Means Safety".

Primary Examiner—Curtis Kuntz
Assistant Examiner—George J. Oehling
Attorney, Agent, or Firm—Lowe, Price, LeBlanc & Becker

[57] ABSTRACT

Disclosed is a method of utilizing a public switched telecommunications network which includes a voice messaging system (VMS) to provide a reliable and flexible notification service to deliver to designated persons a message which may be prestored or created at the time of initiating the notification. The list of persons to be notified is pre-established and permits multiple telephone numbers to be used to locate a single person or an alternate person. Pagers may be simultaneously or sequentially called requesting that the desired person call in for their message. The list of persons to be notified may be changed by the system coordinator from any DTMF telephone and the telephone numbers or pager numbers assigned to persons to be notified may be changed by such persons from any DTMF telephone. Alternatively the list may be created or changed by the coordinator using a personal computer or ASCII data type device. The system automatically reports the results of a notification session to the coordinator and automatic billing is provided. The service includes establishment of redundant data bases in different geographic locales for added reliability.

15 Claims, 5 Drawing Sheets

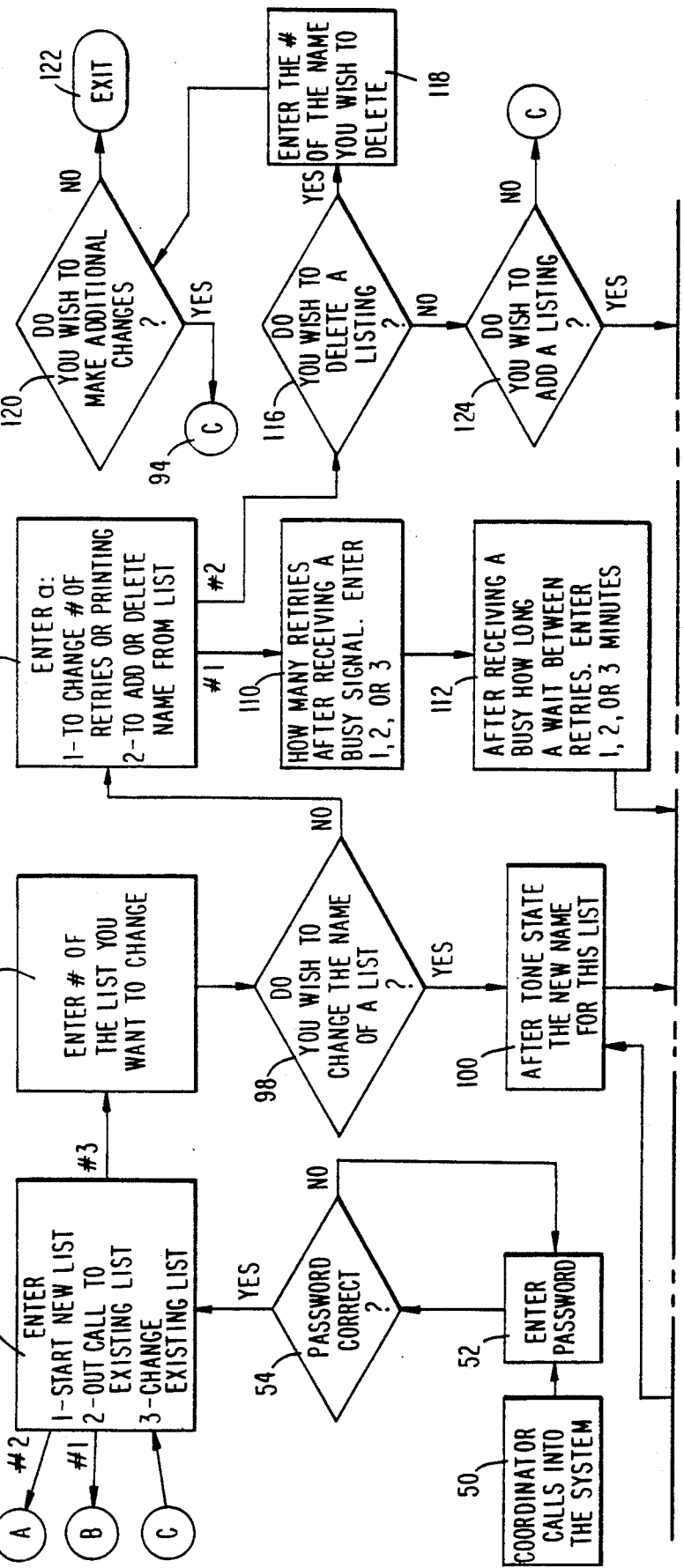

GROUP NOTIFICATION SERVICE AND SYSTEM

TECHNICAL FIELD

This application relates to a group notification service and system and more particularly relates to such a service and system utilizing and integrated into a public switched telecommunications network.

BACKGROUND AND PRIOR ART

Various systems and methodology have been proposed for automatic or semi-automatic dissemination and distribution of a prerecorded message to a designated group or list of directory numbers or persons. In general these systems have been designed for specific purposes such as emergency notifications, various types of alerts, delivery of business messages, and the like. The installation of such a system and service usually entails the acquisition and installation of a sophisticated and costly private business exchange (PBX) for the use of a particular business organization or relatively extensive capital investment to establish a central data and control system linked through leased lines to a public switched telecommunications system (PSTS).

Matthews et al U.S. Pat. No. 4,371,752, issued Feb. 1, 1983, describes a PBX type approach wherein a PBX voice messaging system (VMS) is adapted to record voice messages and accept predesignations of addresses to which the voice messages are to be sent. Upon actuation the PBX VMS then delivers the voice message independently to each person within the group.

Matthews et al U.S. Pat. No. 4,581,486, issued Apr. 8, 1986, describes a generally similar system wherein the user is also permitted to reply to all addresses in the predesignated group.

Matthews et al U.S. Pat. No. 4,761,807, issued Aug. 2, 1988, presents a variation on the foregoing wherein the user must access the system by speaking a password which is then compared to a speaker dependent templet stored in the system.

Bethel et al U.S. Pat. No. 4,446,336, issued May 1, 1984, describes a communications system for distributing and broadcasting announcements individually to a large number of persons using mass announcement units. Each such unit includes a storage disk for storing announcements to be broadcast to the network.

Colman U.S. Pat. No. 3,761,632, issued Sep. 25, 1973, describes an emergency or alarm type notification system which responds to the occurrence of an alarm situation such as fire or burglary. When such an emergency is detected the system automatically dial calls to various telephones according to a programmed sequence and then plays an alarm message to each of the stations or telephones called. Variations in systems of this type are described in related Colman U.S. Pat. Nos. 3,519,745 and 3,700,813.

Hilligoss, Jr. et al U.S. Pat. No. 4,371,751, issued Feb. 1, 1983, describes an automatic message transmitting apparatus which includes a base station and remote unit for receiving inputs indicative of various operator emergency conditions and for thereupon automatically sequentially dialing a plurality of preselected telephone numbers and transmitting messages indicative of the alarm condition. The apparatus includes storage for multiple messages and a keyboard for inputting information such as selected telephone numbers and alarm times.

Community Alert Network of Schenectady, N.Y., advertises a public notification service for correctional facilities. The Community Alert Network (CAN) proposes to provide a prompt method of notifying response teams, corrections officials, off duty personnel, the media, state, county and local law enforcement officers as well as the neighboring community and special facilities such as schools and hospitals in the event of an escape or other type of other emergency at the facility. The CAN apparatus provides a computer driven telephone service at the correctional facility designed for targeted emergency situations.

Community Alert Network contracts with an organization to provide a service for personnel notification and emergency response and establishes a data base of telephone directory numbers provided by the client for each contract. Once the data base is established CAN apparatus provides the notifying process upon the occurrence of the predesignated emergency situation. When an incident has occurred or threatens and has been reported to the appropriate official the notifying process is begun. The designated official contacts CAN via a 24 hour emergency phone number and dictates an access code and password to the CAN operator. The emergency official identifies specific lists of phone numbers to be called and may dictate the message to be delivered. Different messages may be delivered to different targeted groups. Some messages may have been prerecorded and simply recalled. The computers at CAN then begin calling the requested phone numbers and delivering the designated message. A report is later delivered to the client summarizing the number of calls made, completed, busy and no answer, etc. The contract usually entails a start-up fee based upon the size of the telephone number data base in addition to a usage charge based on computer line calling time plus an update charge for modifications to the data base.

Message Processing Systems, Inc. of LaCosta, Calif., advertises an emergency notification automatic outdialing system. The system consists of a micro-computer based central processing unit, keyboard and monitor. The system may be activated from any touch tone telephone by use of the caller's pass code. When verification is completed the system requests the list of individuals to be notified and the caller may choose a prerecorded message or record a new message for transmission. The system thereupon loads the appropriate numbers and commences a calling cycle. The system is primarily designed as consumer premise equipment which includes both hardware and software.

DISCLOSURE OF THE INVENTION

The present invention provides a modern telecommunications network integrated notification service which utilizes existing equipment to make available to the customer or consumer an exceptionally reliable and flexible method to inform specific people of issues or events by calling them and delivering a customized message via the telecommunications network. The service and system allows up to four telephone numbers to be used to locate a single person or an alternate person in place of the primary name on a pre-established list. Pagers may be simultaneously or sequentially called requesting that the desired person call in for their message.

A person or group of people at an organization is assigned the responsibility of acting as the system coordinator who performs the initial act of establishing the list. This is accomplished by the coordinator via a DTMF telephone without the necessity of any on premise equipment.

The coordinator dials into the system and enters a password to be used in all future transactions. The coordinator next forms each desired list. Each list is preferably given a unique name using the voice of the coordinator. The coordinator is then prompted to key in the size of the list required, 25, 50, 75, 100, etc., in increments of 25.

Responsive to prompts the coordinator designates how long the system should wait between attempts if the line is busy and secondly, in the event that one or more of the telephone numbers entered are long distance calls, what credit card number is to be billed.

The coordinator is then asked to verbally state the name of the first person to appear on the list. The system next prompts entry of the first telephone number for this person and the pager number if such is desired. After the telephone number and possibly a pager number is entered they are sequentially prompted to enter a second telephone number or an alternate person. In the latter event they will be requested to state the person's name, in addition to keying in the telephone number. This permits the system to regenerate the person's name upon completing a call to that person.

The operation continues in this manner until a maximum of four numbers or names have been entered. The process continues to the maximum limit that the coordinator entered earlier. Prior to actually using the system, each person on the list may call into the system and, as a substitute for the password entered by the coordinator, may enter a personalized password that will be used during an actual call out by the system. All lists and parameters may be updated at any time by the coordinator.

In order to initiate an actual notification session a coordinator calls into the system and enters their password. If there is more than one list the system prompts the designation of the desired list. The system then prompts the entry of the desired priority designation.

The priority designation entered by the coordinator assigns a class of service to the call which will determine how many trunks are assigned for the particular out-calling and assignment. This in turn determines the rapidity with which the sequence may be completed.

The out-dialing sequence then begins. The first number is dialed and if a person answers the telephone the system states: "There is a message for 'the person's name'. If this person is available please enter the correct password." If the password is correct, the message in the coordinator's voice is delivered. A printed and/or verbal confirmation is then delivered back to the coordinator showing the name, date and time of delivery. If the telephone number was busy, the system retries the number three times. The duration between attempts would have been designated by the coordinator during the original set-up of the list. After three attempts the system goes to the alternate number and/or name for this person. If the wrong password is entered the person would be given three chances. If the password is still incorrect the system would go to the next number and/or name on the list. Similarly, if no one answers the telephone, the system proceeds to the next number and/or person on the list.

This process continues until all four numbers or people are tried. If no one was reached during this process and no one called in for the message, the system would begin the process again for a second and third time if necessary. After the third attempt, the printed report would note that no one could be reached after three attempts including the time each attempt was made.

Simultaneously, pager numbers are called. Up to four pager numbers may be entered for each primary entry. The system dials the pager number and leaves a mailbox number for the person to call into to retrieve their message. All four pager numbers will be called. If no one responds to retrieve the message within a predesignated time limit, this process is repeated two additional times. After this, if no one calls in to retrieve the message and the system is unable to deliver it through it's normal out-dialing procedure, it is noted in the coordinator's printout.

It is accordingly a primary object of the present invention to provide a modern telecommunications network integrated notification service which utilizes existing equipment to make available to the consumer an exceptionally reliable and flexible method to inform specific people of issues or events by calling them and delivering a customized message via the telecommunications network.

It is another object of the invention to provide such an improved notification service wherein the user is able to elect the degree or priority involved and speed with which notification occurs.

It is another object of the invention to provide a modern telecommunications network integrated notification service which permits utilization of existing voice messaging equipment to virtually simultaneously perform multiple functions including the new service.

It is another object of the invention to provide a modern telecommunications network integrated notification service which utilizes existing telephone company equipment and requires no capital investment on the part of customers.

It is another object of the invention to provide such an improved notification service without requiring the purchase, lease or installation of equipment on the consumer's premises.

It is another object of the invention to provide a modern telecommunications network integrated notification service to inform specific people of issues or events through notification either of the specifically designated people or of predesignated alternates such people.

It is still another object of the invention to provide such a modern telecommunications network integrated notification service which permits designated persons to update their listed telephone directory and/or pager numbers.

It is another object of the notification service of the invention to provide an improved notification service of the foregoing type wherein the customer is provided with a verbal or printed report summarizing the number of calls made, completed, busy, no answer, etc.

It is still another object of the invention to provide a modern telecommunications network integrated notification service which provides automated billing using existing PSTN equipment and procedures such as AMA and AMATPS.

It is still another object of the invention to provide a modern telecommunications network integrated notification service which provides enhanced reliability through the provision of redundant storage in geographically separate locales subject to entirely different environmental and ambient conditions.

It is another object of the invention to provide a modern telecommunications network integrated notification service which permits a customer to utilize a personal computer or ASCII data type device to enter and query the data base that resides within the network integrated equipment.

Still other objects and advantages of the present invention will become more readily apparent to those skilled in the art from the following detailed description, wherein a limited number of preferred embodiments of the invention are shown and described, simply by way of illustration of the best mode contemplated of carrying out the invention.

As will be realized the invention is capable of other and different embodiments and its details are capable of modifications in various obvious respects, all without departing from the invention. Accordingly, the drawing and description are to be regarded as illustrative in nature, and not as restrictive.

BRIEF DESCRIPTION OF THE DRAWINGS

The invention will be more fully understood from the following detailed description taken in conjunction with the accompanying drawings, in which:

FIGS. 4A and 4B is a flow chart illustrating the procedure for changing an existing list according to the invention.

BEST MODE FOR CARRYING OUT THE INVENTION

Figure 1:
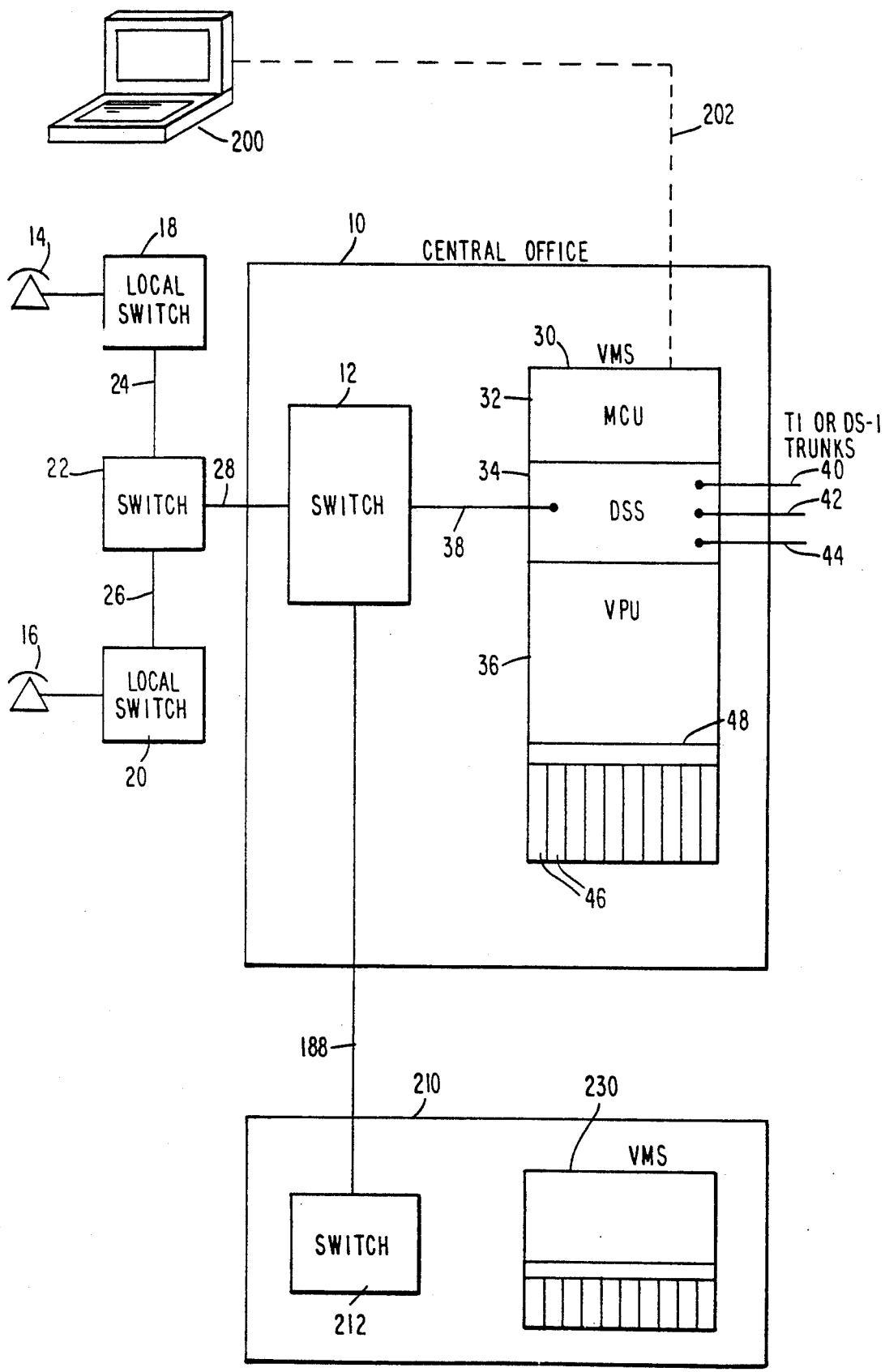
FIG. 1 is a diagrammatic illustration of a first embodiment of the invention.

Referring to FIG. 1 there is shown at 10 a central office having one or more program controlled electronic switches (5ESS, 1AESS, etc.) 12 connected in a public switched telephone network (PSTN) between telephone stations 14 and 16, local switches 18 and 20 and intermediate switches exemplified by switch 22. The switches are interconnected by suitable trunks such as DS1 or T1 trunks 24, 26 and 28.

The switch 12 is housed in a central office 10 which also contains a Voice Messaging System (VMS) generally indicated at 30. The VMS may be of any available commercial manufacture such as, by way of example, the Boston Technology, Inc. CO Access System. The VMS includes a conventional master control unit (MCU) 32, digital switching system (DSS) 34 and voice processing unit (VPU) 36. The VMS is connected to the switch 12 via a suitable trunk such as a DS1 or T1 trunk 38. Outgoing trunks of a suitable type, such as DS1 or T1 trunks are provided as indicated at 40, 42 and 44.

As will be understood by those skilled in the art the VMS 30 is presently utilized in PSTNs to provide various types of voice messaging services. Among the most common of these are central office or telephone company (Telco) based answering services, Voice Mail and call completion.

Voice Mail is a service wherein a caller dials the called party's mailbox number and leaves a message. The called party can retrieve messages by dialing the mailbox from any DTMF telephone and entering an authentication code. By entering instructions from the dial, the message can be repeated, erased, or retained in the file. Voice messages are stored digitally in a voice messaging storage or data base in the VPU.

It is a feature of the present invention that the notification services of the invention may be provided through usage of the VMS equipment already available in the PSTN, such as the VMS equipment illustrated at 30 in FIG. 1. In order to achieve this result it is necessary only to provide additional storage capacity in the VPU along with added software for the MCU. The added storage may be referred to as additional mailboxes but is preferably referenced as added slots depicted graphically as slots 46. These may vary in number but in an illustrative example might comprise 25 slots. In addition to these slots 46 the VPU is provided with an administrator slot depicted graphically at 48. The slots are interconnected with the DSS and MCU to carry out their designated functions under control of the MCU and it's software.

DETAILED DESCRIPTION OF THE INVENTION

The method and system of the invention is now described in conjunction with the drawings.

GENERATING THE ORIGINAL LIST

A person or group of people at an organization is designated as the coordinator. The first step of the coordinator is to create and set up the desired list. This is accomplished by dialing into the system with a DTMF telephone such as any of the telephone stations 14 and 16 shown in FIG. 1.

Figure 2:
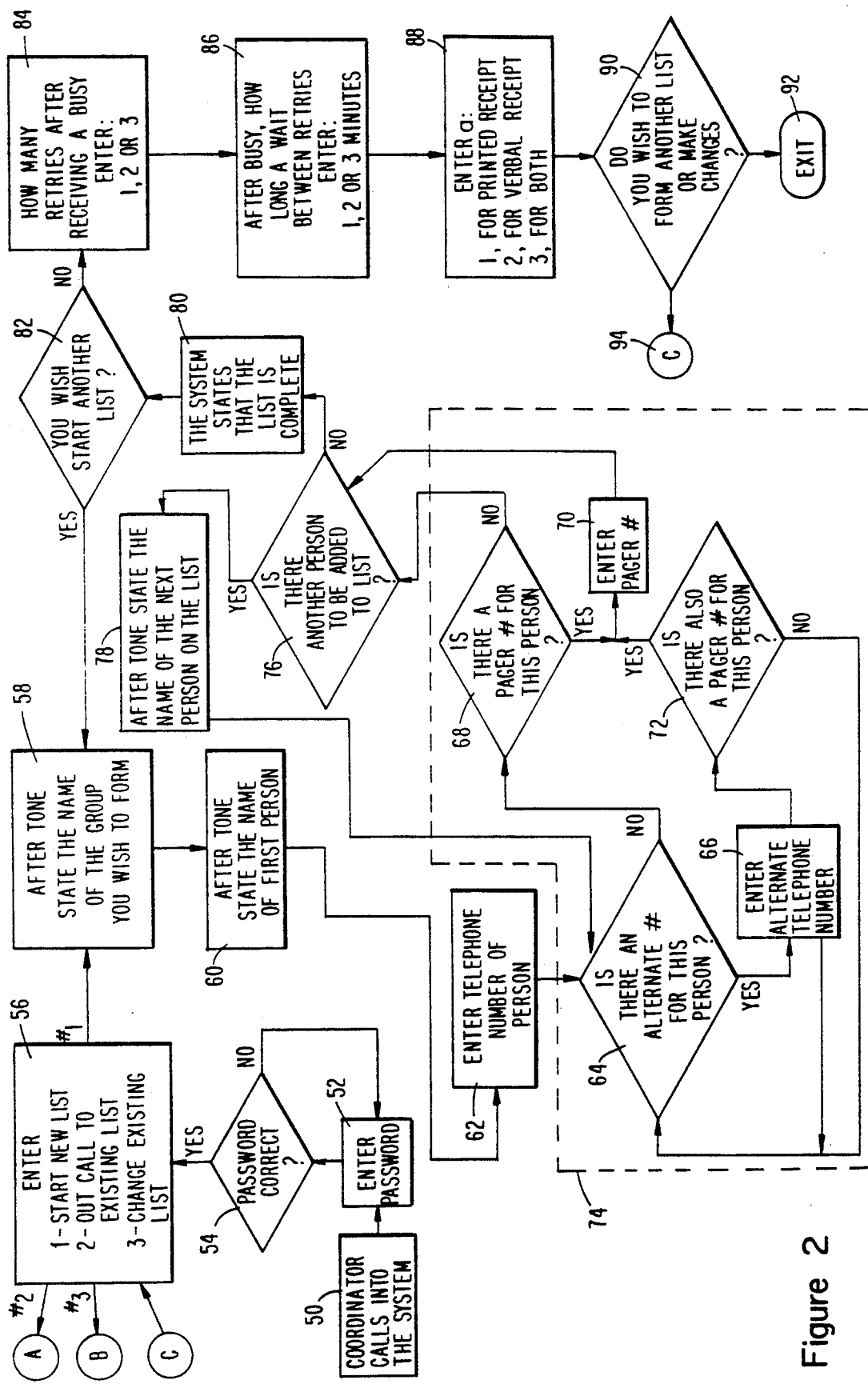
FIG. 2 is a flow chart illustrating the creation or generation of the original list.
Figure 3:
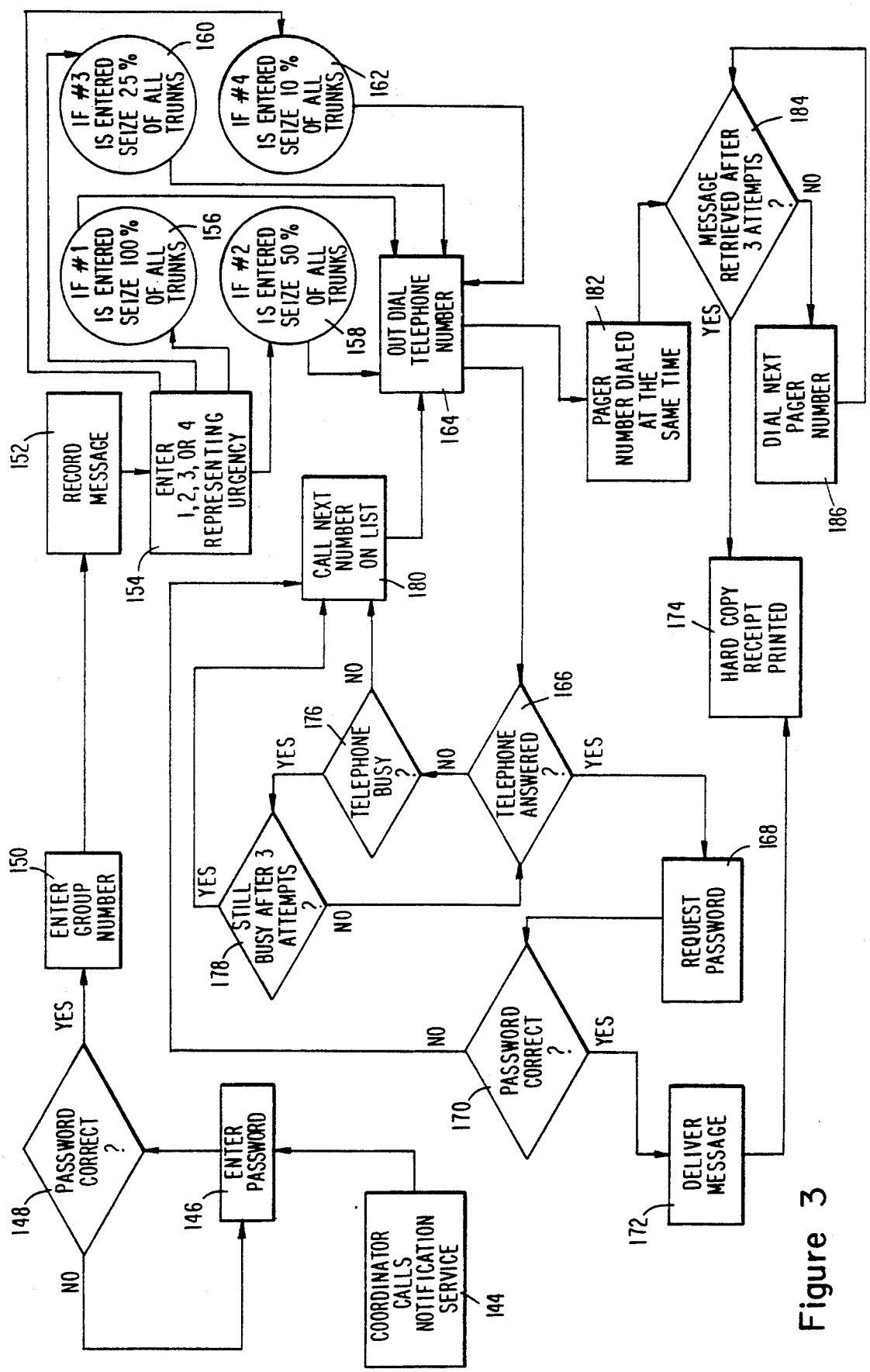
FIG. 3 is a flow chart illustrating a typical operation of the notification service of the invention.

Referring to the flow diagram of FIG. 2, the coordinator dials into the system at 50. Responsive to a verbal prompt the coordinator enters at 52 a temporary password given to them by the Telco. The coordinator is then asked to enter a new password that will be used with all future interactions with the system. The password is verified at 54 and the input of information to create the list and its operating parameters is initiated at 56. At this point the coordinator elects one of three options, namely, (1) start a new list, (2) out-calls to the existing list, or (3) change the existing list.

Assuming that the coordinator elects to create or start a new list and selects the first option, a series of questions is presented by the system for answer by the coordinator via the DTMF buttons. Those questions may be are as follows:

How long should the system wait between attempts if the line is busy?

How many attempts should be made if a line is busy?

Would you like to use your credit card for any long distance calls? If so, please enter the credit card number.

The system would then ask the 10XX code so the user could choose their selected carrier.

Following the input of this data the coordinator is ready to begin the process of building the desired group or groups. At 58 the coordinator is asked to verbally state the name of the first group. This name may be the name of the organization or of a particular work group within the organization.

At 60 the coordinator is prompted to verbally state the name of the first person, organization or work group within this group. At 62 the coordinator is prompted to enter the first telephone number they would like to have dialed in order to reach the person or organization just named. This number is entered via the DTMF keyboard.

Following the entry of this first telephone number the coordinator is queried as to whether or not there is a pager number for the person. If the answer is affirmative the coordinator is prompted to enter the pager number. Following the entry of the pager number the coordinator is prompted to advise if there is a second telephone number they would like to dial in the event the first number is busy after the selected number of attempts, or the number does not answer. This inquiry occurs at 64. If the response is affirmative the coordinator is prompted to enter the alternate telephone number at 66. Up to four telephone numbers may be entered for each listing. If the inquiry as to an alternate telephone number is answered in the negative the coordinator is queried at 68 as to whether or not there is a pager number for the person.

If the answer is affirmative the coordinator is prompted to enter the pager number at 70. The system permits the entry of both an alternate telephone number as well as a pager number for the person designated and an inquiry to this end is provided at 72. Up to four telephone numbers and four pager numbers may be entered for each listing. While in most cases the additional telephone numbers will be alternate locations for the listed person, it may also be a second or third person that could act for the first person within that listing. Similarly, the pager numbers may be for people who could act for the first person within the listing. The establishment of four telephone numbers and four pager numbers is accomplished by repetition of the sequence indicated within the broken lines at 74. The coordinator can end the process by indicating at any time that there are no additional telephone numbers or pager numbers required for this person or organization. The coordinator can close off the group at any time by entering a touch tone button that indicates that there are no more names to be entered.

Having completed the listing for the first person the coordinator is queried at 76 as to whether or not there is another person to be added to the list. If the answer is affirmative the name is verbally entered at 78. The system then repeats the sequence indicated at 74 with respect to this new person on the list. If the coordinator responds to the inquiry at 76 in the negative the list is closed at 80 and the coordinator is queried at 82 as to whether or not it is desired to start another list. If the answer is affirmative the system proceeds to 58 to repeat the sequence just described to form the first list. Each group will have its own distinct number and name; for example, the first group formed will be group number one, the second group number two, etc., enabling the coordinator to quickly access a group at a later date. If the coordinator should reach the maximum number of listings that were contracted for, i.e., 25, 50, 100, etc., the system prompts them that no more listings are available.

No one group can exceed the total number of listings the client ordered. While one person or organizational name and its telephone numbers may appear in many groups, the total number of people or organizations cannot exceed the total number of listings ordered. This would allow the coordinator to set up an organization in the following manner:

Group (1) Vice Presidents
Group (2) Directors
Group (3) Second Levels
Group (4) First Levels
Group (5) One of the Vice Presidents, four of the directors, twelve Second Levels and thirty First Levels
Group (6) Another Vice President's organization
Group (7) Groups 1, 3 and 5
Group (8) The whole organization.

If duplicate names appear due to combining groups the system recognizes the duplication and will only call the person once.

Following completion of the lists as indicated by a negative response at 82 the system provides the necessary prompts for establishing the parameters of operation. Thus at 84 the coordinator is queried and responds as to how many retries are desired after receiving a busy signal. Here the coordinator may enter 1, 2, or 3. At 86 the coordinator is queried and responds to the length of wait desired between retries, such as 1, 2 or 3 minutes. At 88 the coordinator establishes the type of receipt desired following an actual notification session. Thus the coordinator may elect a printed receipt, a verbal receipt, or both. At 90 the coordinator may exit by indicating that no changes are desired and that the lists are complete. The procedure for changing a list or making other changes in the notification session is illustrated in and described in connection with FIG. 4.

MAKING CHANGES TO AN EXISTING LIST AND NOTIFICATION SESSION

Figure 4B:
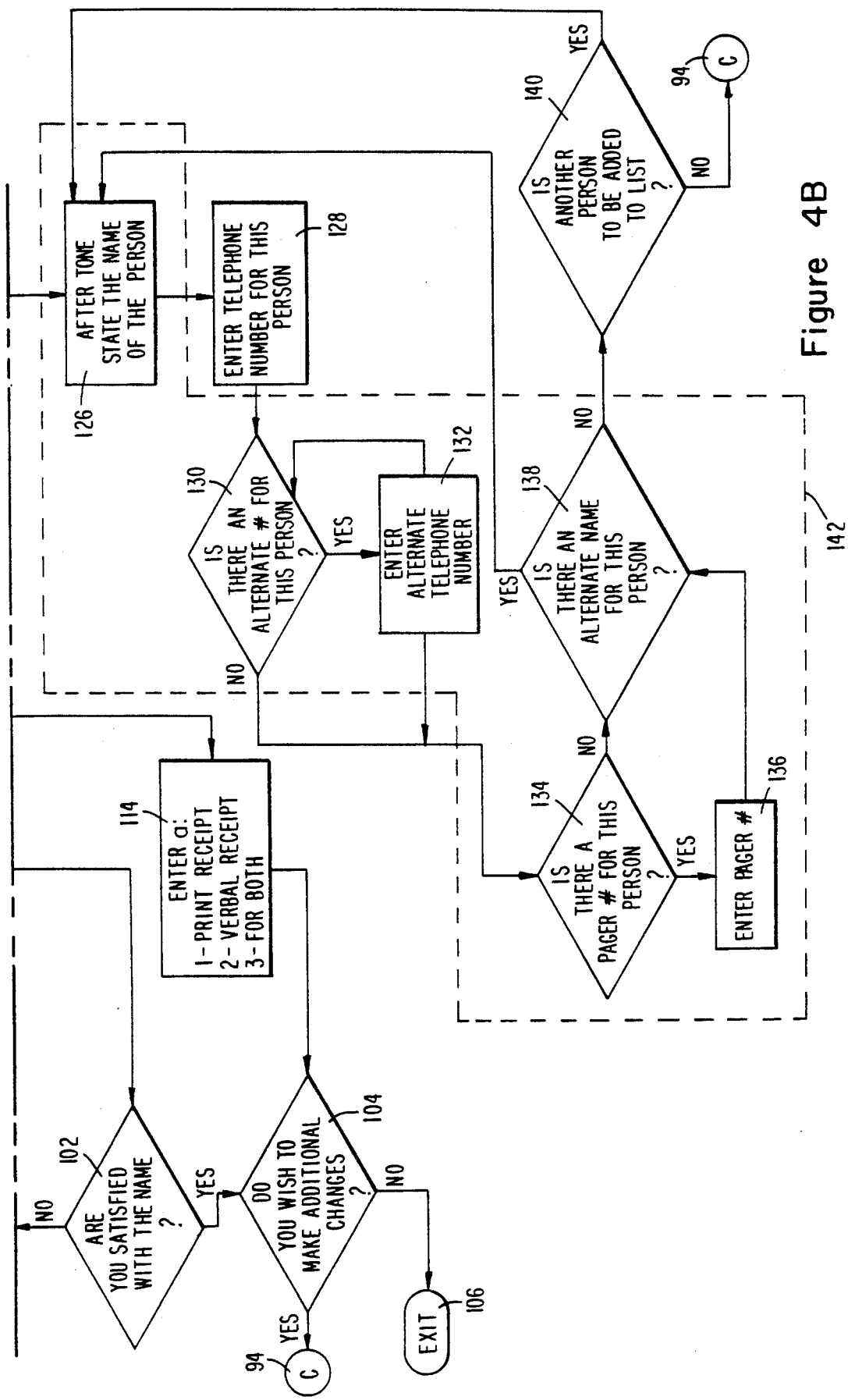

Referring to FIGS. 4A and 4B the coordinator enters at 92 if proceeding from the completion of generation of an original list as just described in connection with FIG. 2. If this is not the case and the coordinator is entering the system to change a previously established list and notification session the coordinators enters at 50 via password identification at 52 and 54. If the coordinator elects to change an existing list at 56 the system proceeds to 96 where the coordinator enters the number of the list it is desired to change. Following entry of the number of the list which the coordinator desires to change, the election is made at 98 as to whether or not it is desired to change the name of the list. If an affirmative response is forthcoming the new name is verbally stated at 100 and this new name is verified or changed at 102.

If the name is verified at 102 the coordinator is queried at 104 as to whether or not additional changes are desired. If the response is negative the coordinator exits the program at 106. If additional changes are desired the coordinator is returned to the entry inquiry at 56 via entry 92. From 92 the coordinator proceeds through steps 56 and 96 and 98 to 108. It is to be noted that this point would be reached initially if the coordinator had responded negatively at 98 in the initial entry.

At 108 the coordinator is queried as to whether it is desired to change the number of retries following a busy/no answer or the printing or, in the alternative, whether it is desired to add or delete a name from a list. If the response indicates a desire to change the number of retries or printing, the coordinator proceeds to 110. Here the coordinator enters directions as to how many retries are desired—1, 2 or 3. Following this the interval between retries is established at 112. The election of a printed receipt, verbal receipt, or both is made at 114. Following this the coordinator may elect to make additional changes or exit the system at 104, 94, or 106.

Returning to the step indicated at 108, if the coordinator indicates a desire to add or delete a name from a list they next proceed to 116 where an election is made as to whether or not to delete a listing. If deletion is desired the coordinator proceeds to 118 to enter the number of the name it is desired to delete. The coordinator thence may proceed to 120 to elect to make additional changes at 94 or to exit at 122.

Returning to the step indicated at 116 if the coordinator has indicated a desire to change a name at 108 and also has indicated no desire to delete a listing at 116 the coordinator proceeds to 124 to indicate a desire to add a listing. At 126 the coordinator verbally states the name of the person to be added to the list. This is followed by the entry of the telephone number for this person at 128. At 130 and 132 the coordinator establishes that an alternate number is to be entered for the newly listed person and enters that number at 132. At 134 the coordinator establishes whether there is a pager number for the newly added listing and enters that number at 136.

In the event that an alternate name is to be entered in place of an alternate number the coordinator proceeds via the negative responses at 130 and 134 to 138. From this point the coordinator returns to 126 to state the name of the alternate person and enter the number at 128. Inasmuch as this is an alternate a negative response will be compelled at 130 followed by the possible entry of a pager number at 134 and 136. From here the coordinator proceeds to 140 from which additional names may be added at 126 or additional changes made via entry 92 to entry step 56. The steps indicated in the broken lines at 142 may be repeated until a total of four names and four pager numbers are entered.

After the entire system configuration is established it is recommended that each recipient call into the system and update their password. If the organization chooses they may allow the recipient the ability to call into the system to update their telephone numbers. This may be very useful if a recipient knows that they will be at a different telephone number than is presently entered into the system. Their entry into the system will only allow them to update passwords and change telephone numbers for their own individual listing. They cannot activate the system or change group information. If updating by recipients is desired a password for each recipient is established by the coordinator along with the entry of the telephone number at 62 in FIG. 2. This password is then retained in the data base to enable that recipient to enter for limited purposes by entering their password at 50, 52, 54 in FIG. 4A.

NOTIFICATION SESSION

In initiating an actual notification session a coordinator calls into the system at 144 and enters their password at 146. This is verified at 148. If there is more than one group the system will inquire as to which group is desired and the group number is entered at 150. If it is desired that more than one group receive the same message the coordinator may nest groups together by entering each of the group numbers to be nested together. The system will verify this selection by restating the name of the group selected. At 152 the coordinator is prompted to take the steps of either recording a message or activating a pre-recorded message.

At 154 the coordinator is prompted to enter a "one" for priority 1, a "two" for priority 2, a "three" for priority 3 or "four" for priority 4. The priority number entered by the coordinator assigns a class of service to the call which will determine how many outgoing call attempts the system will make per minute for this particular out-calling assignment. For example, if a "one" was entered the system will dial out up to 40 attempts per minute for this session. If a "four" was entered the system would make five attempts per minute during this session. If a "two" or "three" were keyed in, some number between 5 and 40 would be the number of attempts per minute made by the system.

If a "one" were entered the system at 156 would seize 100% of all trunks 40, 42 and 44 (FIG. 1). If a "two" were entered the system would seize 50% of all trunks at 158. If a "three" were entered the system would seize 25% of all trunks at 160. If a "four" were entered the system would seize 10% of all trunks at 162.

The out-dialing sequence would then begin at 164. The first number would be dialed at 164. The called telephone would either answer or present a busy/no answer situation at 166. If a person answered a telephone the system would state, "There is a message for . . . (the person's name or organization would be stated in the voice of the coordinator), if this person is available please enter the correct password." If the password is correct the message in the coordinator's voice is then delivered. These steps are shown at 168, 170 and 172.

A printed and/or verbal confirmation is then delivered back to the coordinator at 174 showing the name, date and time of delivery.

The printing of the report may constitute conventional printing and mailing or the production and delivery of a printed report via facsimile or any other imaging terminal. Such a report may be provided only upon completion of the notification session or alternatively may be provided as the session progresses on a phone-by-phone, call-by-call basis.

If the called telephone number presented a busy/no answer condition, the system would retry the number three times. The duration between attempts would have been designated by the coordinator during the original set up of the list. These steps are indicated at 176 and 178.

After three attempts the system would go to the alternate number for this person at 180. If the called person answered and entered an erroneous password, the called person would be given three chances to reenter the correct password. If the entry were still incorrect, the system would go to the next number on the list. Similarly, if no one answered the telephone, the system would proceed to the next number on the list.

This process continues until all four numbers are tried. If no one is reached during this process and no one called in for the message after receiving a pager message, the system would begin the process again for a second a third time if necessary. After the third attempt, the printed report would note that no one could be reached after three attempts, indicating the time each attempt was made.

Simultaneously pager numbers are called at 182. Up to four pager numbers can be entered for each listing. The system will then dial the pager number and leave a mailbox number for the person to call to retrieve their message. All four pager numbers will be called. If no one calls in to receive the message within a predesignated time limit this process repeats itself two additional times as indicated at 184 and 186. If a message is retrieved this will be noted on the coordinator's printout. If no one calls in to retrieve the message and the system was unable to deliver it through normal out-dialing procedures, this will be noted on the coordinator's printout.

TYPICAL APPLICATIONS

The service and system of the invention may be advantageously utilized to cope with situations of the following types and illustrative examples:

1. A manufacturer has to contact specific employees because of a plant emergency such as a chemical spill, an accident, etc.
2. Employees need to be notified of shift changes.
3. Union needs to contact members periodically to deliver information. In many cases it is required that they have some form of confirmation of the date and time the message was delivered.
4. A corporation is able to notify their blue chip customers that their communication system is down and they will be calling them periodically or giving them an alternate contact number.
5. After the service is in place a CEO or Manager could deliver a holiday greeting or a thank you for a great job in their own voice. Using priority four for this application will cost about the same as a 29 cent stamp.
6. If a jail break occurred this service could be activated to notify local authorities.
7. If weather conditions required specific people or organizations to respond quickly to accidents, snow removal, downed trees, etc.
8. Local and State Governments need to contact specific people quickly during riots, national defense and local emergencies.
9. Hospitals need to contact people quickly during local emergencies and disasters.
10. Airports need to contact specific people during plane crashes and weather emergencies.
11. Nationwide broadcasting companies. i.e., Fox, NBC, CBS, ABC, etc., need to contact as many as 200 stations of changes to news programs. Presently they use as many as thirty people in a room to perform this function.
12. Transportation companies (trains, subways, buses) could quickly notify employees to report to specific locations due to emergencies or urgent matters.
13. Corporations could notify their Board of Directors of emergency meetings very quickly.

According to the invention the VMS computer and VPU data base is programmed to provide automated billing using existing PSTN equipment and procedures such as AMA and AMATPS. By way of example, if the coordinator in establishing a list dials in a "0" to enter in a designated number, then it will be a credit card call under all circumstances through the system and will be billed to that credit card. If the coordinator dials a "1" this indicates a local or long distance call that will be billed by the local Telco. Any other digit other than a 0 or 1 will indicate a local call. The new service will be billed to the customer for a fixed monthly charge for the number of mailboxes or slots selected. In addition there is a usage charge which is variable dependent upon the priority selected for any given notification. By way of example in a priority "4" situation the usage charge may be $.45 per completed call in addition to any long distance charges that may automatically be billed over and beyond that on the customer's credit card. The charge per completed call increases with the degree of priority to approximately $1.60–1.70 per completed call for priority "1". Billing will be on a monthly basis in automated fashion through AMA.

A significant advantage of the system and service of the invention is the ability to utilize the existing VMS platform and to share the VMS equipment and connecting trunks. The MCU and DSS are common to all VMS services.

By way of example, each existing VPU can handle up to 4,200 names and each VMS can carry 16 VPUs. Thus by the addition of one VPU there are provided 4,200 names or boxes capable of carrying or storing four numbers and four beeper numbers. One such box or slot is assigned to each line in the system selected by the customer. Thus for a 25 line system 25 slots from the VPU are assigned to telephone directory numbers to be called plus one slot for the administrator. A box or slot is thus an address in the VPU. The administrator's slot or box stores the administrator's password and the parameters of the system established by the customer including any prerecorded message.

When the administrator dials to initiate a notification session the administrator's slot or box establishes the priority and activates a preexisting recording if this option is elected by the administrator. The recording stored in the administrator's box is now inserted into each of the 25 boxes which in turn have stored therein four numbers and four beeper numbers. The out-calling session now begins. If the person carrying a designated beeper number calls in they are directed into the slot or box containing that beeper number. Upon verification of their password they obtain the message from that box. That immediately terminates further procedure in that box and prevents the placing of any additional calls.

Referring to FIG. 1 the notification system is assigned a series of trunks such as DS1 trunks 40, 42 and 44. However while these trunks are assigned to the notification service they are shared with the VMS under control of the MCU. If a notification service call comes in on a priority one basis the system will seize all 24 trunks on a T1 and other VMS services will be shut out from this particular trunk. On the other hand at times when the notification service either is not in use or is in a lower priority condition there is dynamic trunk allocation.

According to another feature of the invention there is provided a further reliability factor to insure constant availability of the notification service. Referring to FIG. 1 there is shown a central office 10 which may be located, for example, in New Brunswick, N.J. At 210 there is shown a central office of a similar type containing a switch 212 and VMS indicated generally at 230. The VMS may be similar or identical to the VMS 30 in the central office 10. Central office 210 may be, for example, in Cherry Hill, N.J., or in Richmond, Va. The two VMS installations 30 and 230 are networked via a DS1 link 188 between the switches 12 and 212. In the situation where a customer arranges the notification service in New Brunswick and is concerned about the possibility of various types of telecommunications, power or other emergency failures redundant storage and functionality may be economically provided by such a network link and duplicate storage in the VMS 230 in another city subject to entirely different environmental and ambient conditions.

Thus if the client in New Brunswick is unable to reach its New Brunswick VMS to provide out-dial notification they need only call upon the redundant storage and out-dial capability in the redundant VMS system in Cherry Hill or Richmond. If the redundancy is supplied from Cherry Hill the storage may be virtually completely duplicate. If the storage is in Richmond, Va., the only difference in the storage is the addition of the area code because of the long distance nature of the call. However in the event of a true emergency this added charge offers a relatively inexpensive provision of an otherwise unobtainable reliability.

According to a still further feature of the invention illustrated in FIG. 1 the notification system may include the ability for a customer to utilize a personal computer (PC) or PC-like device to enter and upgrade information to the VMS. To provide such capability there may be a PC 200 linked to the VMS 30 via a link 202. With this arrangement it is possible to utilize an ASCII data type device to enter and query the data base that resides within the VMS. With such an arrangement it is possible to collect and arrange all of the necessary data in the ASCII-type device and batch dump that data into the VMS in a highly efficient and time saving manner. While it may be necessary or desirable to enter the VMS via the PSTN to provide the message and names, the upgrading of telephone numbers and changing, activation and deactivation of names may be effected through the PC link. Such a digital terminal link may also be utilized to activate the out-dialing sequence. When it is considered that activation may otherwise be accomplished via any DTMF access to the PSTN, including cellular terminals, this provides a very wide flexibility and reliability.

Another application of the notification service of the invention is to permit businesses to continue to function in the event of a communication failure. By way of example, a bank may use a minimal 25 slot VMS allocation to provide notification to its 25 most important clients to advise, for example, "Our internal communication system is down. Please call us on XXX-XXXX and leave a message. An operator will call every five minutes to retrieve your phone calls and we will get back to you immediately." The clients thus notified will call the designated number which will constitute mailboxes established on a temporary basis for this emergency purpose. The bank can scan those mailboxes and contact the individual clients through a home or remote location during the emergency in this fashion. Such an emergency may arise where, for example, the PBX for a bank fails. The temporary mailboxes may be provided in the same VMS system as the notification service and many other VMS services.

Still other objects and advantages of the present invention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

I claim:

1. In a public switched telecommunications network (PSTN) having a plurality of switch means interconnected by trunk means; voice message service (VMS) means including voice processing unit (VPU) means having first data storage means connected to one of said switch means; subscriber telephone station (STS) means connected to one of said switch means and connectable through said PSTN to said VMS means; the method of providing notification services comprising the steps of:

establishing in said VMS means a second data storage capacity distinct from said first data storage means;

establishing a data base which includes the identity of STS means subscribing to the notification service;

accessing said VMS means from DTMF STS means via said PSTN and in response to DTMF signals from said DTMF STS means storing in said second storage capacity a data base including:

(a) data identifying at least one group of destination telephone station (DTS) means to which said notification is to be delivered, (b) data identifying alternate DTS means for at least some of the DTS means of the group, (c) data identifying alternate media terminals for at least some of the DTS means of the group, and (d) data relating to the mode of delivery of said notification, wherein said data relating to the mode of delivery of said notifications includes a relative time priority for executing said notifications which includes a trunk capacity to be used in contacting said DTS means;

accessing said VMS means via said PSTN;

establishing via said data base in said second data storage capacity in said VMS means the identity of the accessing entity as an STS means subscribing to the notification service;

establishing via said data base in said second data storage capacity in said VMS means a message to be delivered;

transmitting to said VMS means a signal directing performance of said notification service; and in response to said signal, initiating a sequence of notification steps pursuant to the data stored in said second data storage capacity for delivery of the stored message.

2. A method according to claim 1, wherein said data relating to the mode of delivery of said notifications further includes data establishing an interval between successive attempts to contact a DTS means.

3. A method according to claim 1, wherein said data relating to the mode of delivery of said notification further includes a degree to which trunks are shared between said notification service and other services provided by said VMS means.

4. A method according to claim 1 wherein said accessing of said VMS means via said PSTN is by radio link.

5. In a public switched telecommunications network (PSTN) having a plurality of switch means interconnected by trunk means; voice message service (VMS) means including voice processing unit (VPU) means having first data storage means connected to one of said switch means; subscriber telephone station (STS) means connected to one of said switch means and connectable through said PSTN to said VMS means; the method of providing notification services comprising the steps of:

establishing in said VMS means a second data storage capacity distinct from said first data storage means;

establishing a data base which includes the identity of STS means subscribing to the notification service;

accessing said VMS means from DTMF STS means via said PSTN and in response to DTMF signals from said DTMF STS means storing in said second storage capacity a data base including:

(a) data identifying at least one group of destination telephone station (DTS) means to which said notification is to be delivered, (b) data identifying alternate DTS means for at least some of the DTS means of the group, (c) data identifying alternate media terminals for at least some of the DTS means of the group, and (d) data relating to the mode of delivery of said notification;

storing in said VMS means for each DTS means an accessing address for use by a party corresponding to said DTS means;

said party accessing said address and changing a directory number corresponding to said address;

accessing said VMS means via said PSTN;

establishing via said data base in said second data storage capacity in said VMS means the identity of the accessing entity as an STS means subscribing to the notification service;

establishing via said data base in said second data storage capacity in said VMS means a message to be delivered;

transmitting to said VMS means a signal directing performance of said notification service; and in response to said signal, initiating a sequence of notification steps pursuant to the data stored in said second data storage capacity for delivery of the stored message.

6. A method according to claim 5, wherein said data relating to the mode of delivery of said notifications includes data establishing a relative time priority for executing said notifications.

7. A method according to claim 5 wherein said message to be delivered to said DTS means is established in said second data storage capacity prior to accessing said VMS means to transmit said signal directing performance of said notification service.

8. A method according to claim 7 wherein said message is established substantially at the time of storing said data identifying said group of DTS means.

9. A method according to claim 5 wherein said message to be delivered to said DTS means is established in said second data storage capacity following accessing said VMS means to transmit said signal directing performance of said notification service.

10. A method according to claim 5 wherein at least one of said DTS means comprises a toll station means including the steps of:

storing in said VMS means credit card identification data; and automatically billing for toll charges associated with notification of said toll station means.

11. A method according to claim 5 including the steps of:

establishing in a second VMS means having a second data storage capacity data substantially identical to the data stored in said second storage capacity of said first named VMS means;

accessing said second VMS means via net link means;

establishing via said data base in said second VMS means the identity of the accessing entity as an STS means subscribing to the notification service;

establishing via said second data storage capacity in said second VMS means a message to be delivered to said DTS means;

transmitting to said second VMS means a signal directing performance of said notification service;

said second VMS means responsive to said signal initiating a sequence of notification steps pursuant to data stored in said second data storage capacity in said second VMS means.

12. A method according to claim 11 wherein said second VMS means is located in a different toll area code than said first named VMS means.

13. A method according to claim 5 wherein said VMS means delivery of said message to a DTS means is conditioned upon prior receipt of an identification code from said DTS means.

14. In a public switched telecommunications network (PSTN) having a plurality of switch means interconnected by trunk means; voice message service (VMS) means including voice processing unit (VPU) means having first data storage means connected to one of said switch means; subscriber telephone station (STS) means connected to one of said switch means and connectable through said PSTN to said VMS means; the method of providing notification services comprising the steps of:

establishing in said VMS means a second data storage capacity distinct from said first data storage means;

establishing a data base which includes the identity of STS means subscribing to the notification service;

accessing said VMS means from DTMF STS means via said PSTN and in response to DTMF signals from said DTMF STS means storing in said second storage capacity a data base including:

(a) data identifying at least one group of destination telephone station (DTS) means to which said notification is to be delivered, (b) data identifying alternate DTS means for at least some of the DTS means of the group, (c) data identifying alternate media terminals for at least some of the DTS means of the group, and (d) data relating to the mode of delivery of said notification;

storing in said VMS means for each DTS means an accessing address for use by a party corresponding to said DTS means;

said party accessing said address and changing a directory number of an alternate media terminal corresponding to said address;

accessing said VMS means via said PSTN;

establishing via said data base in said second data storage capacity in said VMS means the identity of the accessing entity as an STS means subscribing to the notification service;

establishing via said data base in said second data storage capacity in said VMS means a message to be delivered;

transmitting to said VMS means a signal directing performance of said notification service; and in response to said signal, initiating a sequence of notification steps pursuant to the data stored in said second data storage capacity for delivery of the stored message.

15. A method according to claim 14 wherein alternate media terminals comprise pager terminals contacted by radio links.

* * * * *